No. 747,010. PATENTED DEC. 15, 1903.
L. L. SMITH.
COMBINED LIGHTING, HEATING, AND COOKING APPARATUS.
APPLICATION FILED FEB. 26, 1903.
NO MODEL. 2 SHEETS—SHEET 1.
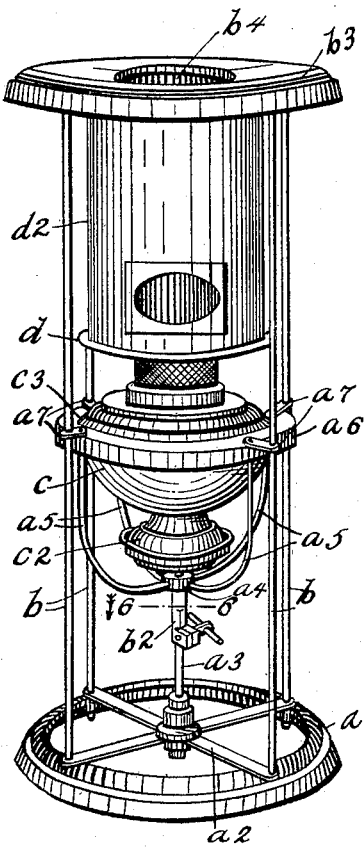
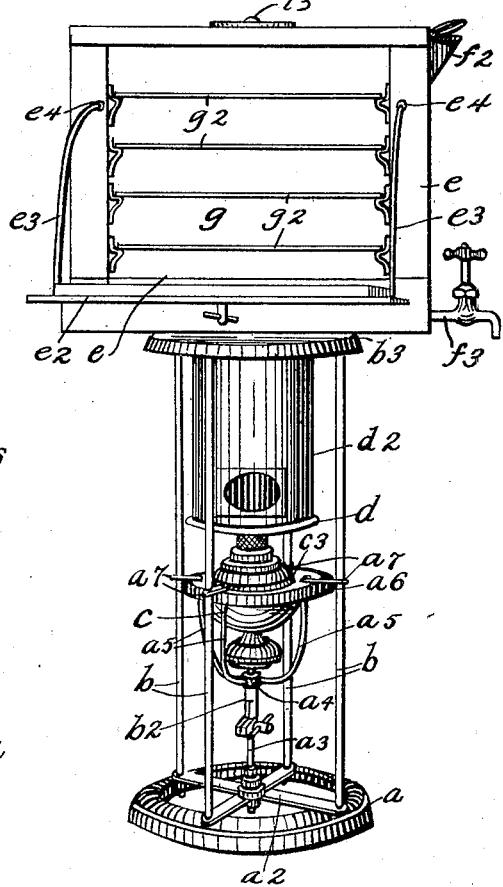
WITNESSES
INVENTOR
Louis Lum Smith
BY
Edgar Tate & Co.
ATTORNEYS No. 747,010. PATENTED DEC. 15, 1903.
L. L. SMITH.
COMBINED LIGHTING, HEATING, AND COOKING APPARATUS.
APPLICATION FILED FEB. 26, 1903.
NO MODEL. 2 SHEETS—SHEET 2.
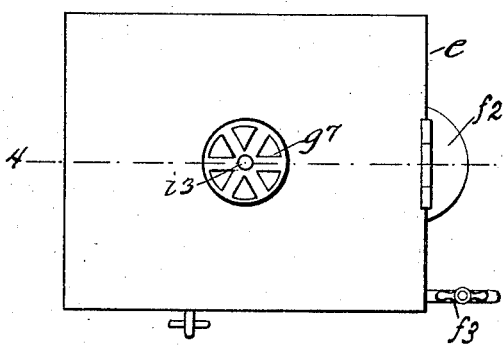
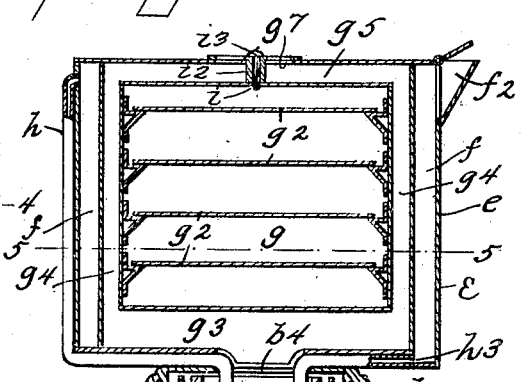
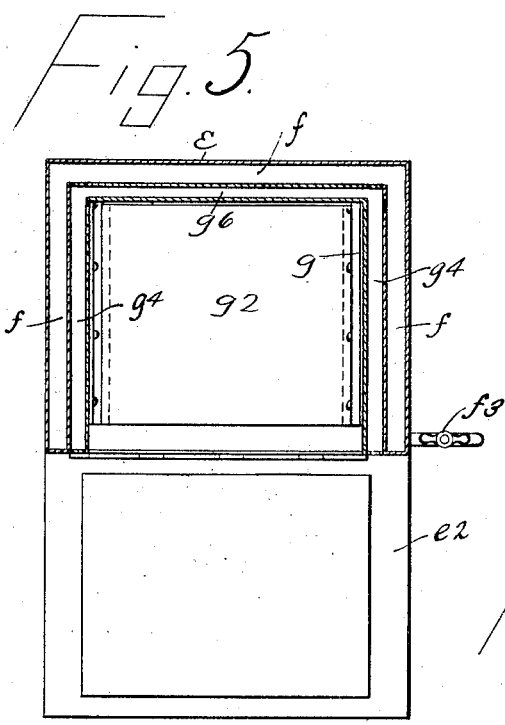
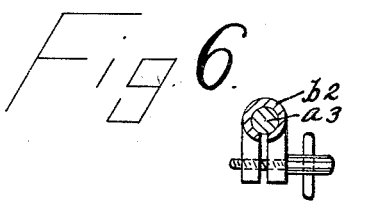
WITNESSES
S. L. Gottheimer.
J. C. Larsen
INVENTOR
Louis Lum Smith
BY
Edgar Tate & Co.
ATTORNEYS No. 747,010. Patented December 15, 1903.

UNITED STATES PATENT OFFICE.

LOUIS LUM SMITH, OF NEW YORK, N. Y.

COMBINED LIGHTING, HEATING, AND COOKING APPARATUS.

SPECIFICATION forming part of Letters Patent No. 747,010, dated December 15, 1903.

Application filed February 26, 1903. Serial No. 145,177. (No model.)

*To all whom it may concern:*

Be it known that I, LOUIS LUM SMITH, a citizen of the United States, residing at New York, in the county of New York and State of New York, have invented certain new and useful Improvements in a Combined Lighting, Heating, and Cooking Apparatus, of which the following is a specification, such as will enable those skilled in the art to which it appertains to make and use the same.

The object of this invention is to provide an improved lighting, heating, and cooking apparatus designed particularly for use in small apartments, but which may be used wherever apparatus of this class is required; and with this and other objects in view the invention consists in an apparatus of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a perspective view of my apparatus as designed for use as a heater; Fig. 2, a similar view showing the apparatus designed for use as a heater and cooker; Fig. 3, a plan view of the apparatus shown in Fig. 2; Fig. 4, a section on the line 4 4 of Fig. 3; Fig. 5, a section on the line 5 5 of Fig. 4, and Fig. 6 a section on the line 6 6 of Fig. 1.

In the practice of my invention I provide a base $a$, which is preferably circular in form and provided with transverse radial members $a^2$, which form a support for a central rod $a^3$, on which is mounted a vertically-movable collar $a^4$, having upwardly-directed arms $a^5$, which are connected with an annular plate or support $a^6$, which in the form of construction shown is provided with radial members $a^7$. The base $a$ is also provided with vertically-arranged frame-rods $b$, which pass through the members $a^7$, which are vertically movable on said rods, and below the collar $a^4$ the rod $a^3$ is provided with a vertically-movable clamp $b^2$, and by means of this construction the annular support $a^6$ may be vertically adjusted on the rod $a^3$.

A top plate $b^3$ is connected with the rods $b$, and this plate, in the form of construction shown, is provided with a central opening $b^4$, but may be provided with a number of openings, if desired. The vertically-adjustable support $a^6$ is intended to support a lamp $c$, which is preferably of the ordinary central-draft type, and this lamp may be removed from said support whenever desired and is of course vertically adjustable therewith. The lamp $c$ is shown in full lines in Figs. 1 and 2 and indicated in dotted lines in Fig. 4, and the base $c^2$ of said lamp and the bottom portion of the reservoir when said lamp is in position is passed through the annular support $a^6$, and said lamp is provided with an annular flange or bead $c^3$, which rests on said support; but the lamp may be connected with said support in any desired manner.

The base of the burner of the lamp serves as a support for a plate $d$, on which is placed when the apparatus is intended simply as a heater a drum $d^2$, and it will be apparent that an ordinary chimney may be substituted for said drum whenever it is desired to use the lamp for illuminating purposes.

When it is desired to use my improved apparatus for the purpose of cooking, heating water, and similar purposes, I place on the top plate $b^3$ an oven $e$, provided at the front with a hinged door $e^2$, having curved side rods or arms $e^3$, which are adapted to pass backwardly through openings $e^4$ in the front side walls of the oven $e$, and by means of this construction the door $e^2$ may be raised or lowered whenever desired. The side and back walls of the oven $e$ are provided with water chambers or receptacles $f$, which are all in communication, as shown in Fig. 5, and at one side of the top of the oven is a spout $f^2$, through which water may be passed into the chambers or receptacles $f$, and at the bottom of said oven and at one side thereof is a discharge-faucet $f^3$, through which water from the chambers or receptacles $f$ may be drawn. Within the oven $e$ is a central supplemental oven $g$, having removable shelves $g^2$, and between the supplemental oven $g$ and the top of the oven $e$ and at the bottom, side, top, and back walls of said oven are flue-spaces $g^3$, $g^4$, $g^5$, and $g^6$, and these flue-spaces entirely surround the supplemental oven $g$, except at the front, and the hole or opening $b^4$ in the top plate $b^3$, which is connected with the rods $b$, communicates with the bottom flue-space $g^3$, and the top of the oven $e$ is provided with an opening $g^7$, and formed in the top of the supplemental opening $g$ is an opening $i$, preferably inclosed by a casing $i^2$ and adapted to be closed by a plug $i^3$ and designed to allow of the escape of volatile gases from said oven.

When the apparatus is used for the purpose of cooking, heating water, and similar purposes, I preferably connect with the top portion of one of the water chambers or receptacles a pipe $h$, which is carried down transversely of the side of the oven $e$ and half-way across the bottom thereof and formed into a vertically-arranged coil $h^2$ and carried upwardly, as shown at $h^3$, and connected with the bottom of the opposite water chamber or receptacle, as shown at $h^3$, and in practice a chimney or flue $h^4$, of asbestos or other suitable material, is placed on the support $d$, and in placing the oven in position on the plate $b^3$ the coil $h^2$ passes downwardly or into the flue or chimney $b^4$, and the bottom of said coil incloses the burner of the lamp, as clearly indicated in said figure. When the door $e^2$ is closed, the rods or arms pass backwardly into the flue-space $g^4$ at the opposite sides of the oven and do not interfere in any way with the operation of the oven, and it will be apparent that the water in the water chambers or receptacles $f$ may be highly heated by means of the coil $h^2$, through which the heat from the burner of the lamp passes. The oven $e$ may be removed whenever desired and the apparatus used independently thereof as a heater or an illuminator, and an ordinary lamp-chimney may be substituted for the parts $d^2$ and $h$ whenever desired, and whenever it is necessary to use the oven $e$ the parts $d^2$ and $h^2$ will be placed in the position shown and the oven also placed in the position shown in Figs. 2 and 4.

My invention is not limited to the particular form and arrangement of the supplemental oven $d$, nor to the particular form or arrangement of the water chambers and receptacles $f$, nor to the form and arrangement of the flue-spaces $g^3$, $g^4$, and $g^5$, and many changes in and modifications of the details of the construction herein shown and described may be made without departing from the spirit of my invention or sacrificing its advantages.

Although I have shown and described a supporting-frame and a vertically-adjustable lamp mounted therein, my invention, as far as the heating and cooking features thereof are concerned, is not limited to an oil or a vertically-adjustable burner, and in place of the oil-lamp I may use a gas or vapor burner, and said gas or vapor burner may be supported in any desired manner and may be made in any preferred way and may be provided with a drum or with a chimney, or with both a drum and a chimney, and in either event the heating-coil $h^2$ may be used in connection with the oven $e$, as herein shown and described.

Having fully described my invention, what I claim as new, and desire to secure by Letters Patent, is—

1. An apparatus of the class described comprising a base having a central vertical rod, frame-rods connected with said base concentric to the central rod, a lamp-support vertically adjustable on the central rod and movable on the frame-rods, and a chimney or other support adapted to be mounted on the burner of the lamp when the latter is in position, substantially as shown and described.

2. An apparatus of the class described comprising a base having a central vertical rod, frame-rods connected with said base concentric to the central rod, a lamp-support vertically adjustable on the central rod and movable on the frame-rods, and a chimney or other support adapted to be mounted on the burner of the lamp when the latter is in position, said frame-rods being also provided with a top plate, substantially as shown and described.

3. An apparatus of the class described comprising a base having a central vertical rod, frame-rods connected with said base concentric to the central rod, a lamp-support vertically adjustable on the central rod and movable on the frame-rods, and a chimney or other support adapted to be mounted on the burner of the lamp when the latter is in position, said frame-rods being also provided with a top plate, and an oven adapted to be placed on said top plate and provided with flue-spaces which communicate with the chimney, substantially as shown and described.

4. An apparatus of the class described comprising a base having a central vertical rod, frame-rods connected with said base concentric to the central rod, a lamp-support vertically adjustable on the central rod and movable on the frame-rods, and a chimney or other support adapted to be mounted on the burner of the lamp when the latter is in position, said frame-rods being also provided with a top plate, and an oven adapted to be placed on said top plate and provided with flue-spaces which communicate with the chimney, and with water chambers or receptacles, and a pipe communicating with the top portion of one of said water chambers or receptacles and with the bottom portion of another and formed into a coil and adapted to be inserted into the chimney, substantially as shown and described.

5. An apparatus of the class described comprising a frame having a top plate provided with an opening, a vertically-adjustable lamp-support mounted in said frame and adapted to support a lamp, a support adapted to be mounted on the burner of the lamp when the latter is in position, a chimney or drum mounted on said support, and an oven adapted to be placed on the top plate of the frame and provided with an inner supplemental oven, flue-spaces communicating with the chimney, and water chambers or receptacles, substantially as shown and described.

6. In an apparatus of the class described, a frame or support, a vertically-adjustable lamp mounted therein, and an oven adapted to be mounted on said frame or support and provided with water chambers or receptacles and a pipe communicating with the top and bottom portions of said water chambers or receptacles and formed into a coil adapted to be inserted into the chimney of the lamp, substantially as shown and described.

7. In an apparatus of the class described, a burner provided with a chimney, and an oven adapted to be supported thereover and provided with water-chambers, and a pipe connected with said chambers and formed into a coil which is adapted to enter said chimney, substantially as shown and described.

8. In an apparatus of the class described, a frame, a lamp-support vertically adjustable therein, a chimney-holder adapted to be placed on the lamp when the latter is in position, and an oven adapted to be supported on said frame and provided with flues which communicate with the chimney when the latter is in position, said oven being also provided with water-chambers and pipes communicating therewith and formed into a coil adapted to enter said chimney, substantially as shown and described.

9. In an apparatus of the class described, a frame, a lamp vertically adjustable therein, a chimney supported by said lamp, and an oven adapted to be supported on said frame and provided with a water-chamber and pipes communicating with said chamber and formed into a coil adapted to be inserted into said chimney, substantially as shown and described.

10. In an apparatus of the class described, a frame, a lamp vertically adjustable therein, a chimney supported by said lamp, and an oven adapted to be supported on said frame and provided with a water-chamber and pipes communicating with said chamber and formed into a coil adapted to be inserted into said chimney, said oven being also provided with flues which communicate with said chimney, substantially as shown and described.

11. In an apparatus of the class described, a burner provided with a chimney and an oven adapted to be supported over said burner and provided with a water-chamber, and a pipe communicating therewith and formed into a coil adapted to be inserted into said chimney, substantially as shown and described.

12. In an apparatus of the class described, a burner provided with a chimney and an oven adapted to be supported over said burner and provided with a water-chamber, and a pipe communicating therewith and formed into a coil adapted to be inserted into said chimney, said oven also being provided with flue-spaces which communicate with said chimney, substantially as shown and described.

In testimony that I claim the foregoing as my invention I have signed my name, in presence of the subscribing witnesses, this 24th day of February, 1903.

LOUIS LUM SMITH.

Witnesses:
T. A. STEWART,
C. E. MULREANY.